United States Patent
Haerter

(10) Patent No.: US 12,370,886 B2
(45) Date of Patent: Jul. 29, 2025

(54) ELECTRIC DRIVE DEVICE FOR A MOTOR VEHICLE

(71) Applicant: Mercedes-Benz Group AG, Stuttgart (DE)

(72) Inventor: Tobias Haerter, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/715,997

(22) PCT Filed: Nov. 18, 2022

(86) PCT No.: PCT/EP2022/082502
§ 371 (c)(1),
(2) Date: Jun. 3, 2024

(87) PCT Pub. No.: WO2023/117235
PCT Pub. Date: Jun. 29, 2023

(65) Prior Publication Data
US 2025/0026195 A1    Jan. 23, 2025

(30) Foreign Application Priority Data
Dec. 20, 2021   (DE) .................... 10 2021 006 255.8

(51) Int. Cl.
*B60K 17/16*     (2006.01)
*F16H 55/08*     (2006.01)
(Continued)

(52) U.S. Cl.
CPC ............. *B60K 17/16* (2013.01); *F16H 55/08* (2013.01); *F16H 57/082* (2013.01)

(58) Field of Classification Search
CPC ....... B60K 17/16; F16H 55/08; F16H 57/082; F16H 55/14; F16H 2055/176; F16H 57/028; F16H 57/03; H02K 5/24; H02K 7/116
See application file for complete search history.

(56) References Cited

U.S. PATENT DOCUMENTS

| 8,973,456 | B2 | 3/2015 | Takenaka et al. |
| 2010/0292043 | A1 | 11/2010 | Tao et al. |
| 2018/0031049 | A1 | 2/2018 | Heitzenrater |

FOREIGN PATENT DOCUMENTS

| CN | 111727091 A | * | 9/2020 | ........... B21D 22/025 |
| CN | 114754122 A | * | 7/2022 | ................ F16H 1/28 |

(Continued)

OTHER PUBLICATIONS

International Search Report (PCT/ISA/210) issued in PCT Application No. PCT/EP2022/082502 dated Mar. 1, 2023 (2 pages).
(Continued)

*Primary Examiner* — Tinh Dang
(74) *Attorney, Agent, or Firm* — Crowell & Moring LLP

(57) ABSTRACT

An electric drive device for a motor vehicle includes an electric motor for driving the motor vehicle and a planetary gear set which has a ring gear and is disposed in a transmission housing formed from a die-cast material. The transmission housing has a moulded internal toothing as the first toothing into which a corresponding external toothing disposed on the ring gear engages as the second toothing such that the ring gear is connected to the transmission housing for conjoint rotation. There is disposed between the toothings a plastics ring via which the toothings are supported against each other.

4 Claims, 2 Drawing Sheets

(51) Int. Cl.
*F16H 55/14* (2006.01)
*F16H 57/032* (2012.01)
*F16H 57/08* (2006.01)

(56) References Cited

FOREIGN PATENT DOCUMENTS

| | | |
|---|---|---|
| DE | 198 10 918 A1 | 9/1999 |
| DE | 102 30 861 A1 | 1/2004 |
| DE | 11 2008 004 241 T5 | 5/2012 |

OTHER PUBLICATIONS

German-language German Office Action issued in German Application No. 10 2021 006 255.8 dated Jul. 19, 2022 (6 pages).

\* cited by examiner

ELECTRIC DRIVE DEVICE FOR A MOTOR VEHICLE

BACKGROUND AND SUMMARY OF THE INVENTION

The invention relates to an electric drive device for a motor vehicle, in particular for a motor car.

Electric drive devices of this type for motor vehicles are already known from the general prior art. The respective, electric drive device has at least one electric motor for driving the respective motor vehicle and a planetary gear set and a gearing housing. The planetary gear set has a ring gear. Furthermore, the planetary gear set is arranged in the transmission housing. The transmission housing is formed from a die-cast material.

Furthermore, DE 102 30 861 A1 discloses a motor vehicle transmission. A friction clutch is known from DE 198 10 918 A1.

The object of the present invention is to further develop an electric drive device of the above-mentioned type in such a way that particularly advantageous noise behavior can be implemented.

In order to further develop an electric drive device of the type specified herein in such a way that particularly advantageous noise behavior can be implemented, it is provided in accordance with the invention that the transmission housing has a moulded internal toothing, which is a first toothing or is also referred to as a first toothing. The feature that the internal toothing is moulded is to be understood to mean that the transmission housing is formed from a die-cast material, is formed as a cast component and thus is manufactured by casting. Therefore, the internal toothing is similarly manufactured by the casting and thus is integrally moulded on or from the transmission housing, also simply referred to as a housing.

An external toothing corresponding with the internal toothing of the transmission housing is provided on the ring gear and is a second toothing or also referred to as second toothing. In particular, the external toothing is formed in one piece with the ring gear. The external toothing meshes with the corresponding internal toothing, whereby the ring gear is connected to the transmission housing for conjoint rotation. A plastics ring is arranged between the toothings, in particular between the respective teeth of the toothings and serves to allow the toothings to be supported against each other in particular in the circumferential direction of the planetary gear set. In particular, the toothings are formed from a respective, metal material. Since the plastics ring, i.e., a ring made of plastics material, is now arranged between the toothings, direct contact between the toothings, which in particular are metal, is avoided, which can prevent excessive noise. The invention is based in particular on the following findings.

In order to support torque from components in a housing, drive gearings are moulded in housings. Thus, the internal toothing is a drive gearing, for example. For example, the head of the respective drive gearing is machined into a circular cylindrical shape, wherein, however, both the flanks and a root circle of the drive gearing should usually have a moulded bevel, for example to enable the housing, in particular the transmission housing, to be removed from a mould by means of which the housing or transmission housing is produced by casting. The fact that a mechanically machined component, such as the external toothing with straight flanks, is usually inserted there and therefore meshes with the internal toothing, results in linear contact between the toothings and no surface contact in the toothings. As a result, excitations of the component having the external toothing, such as the ring gear, can be transmitted to the housing at least substantially undamped via the usually direct contact of the toothings. The housing has large surfaces, which can function as a membrane, so that undesirable noises may occur. The transmission housing for example, and thus the internal toothing, are formed from a steel. Furthermore, it is conceivable that the external toothing provided on a ring gear carrier of the ring gear, for example, is formed from aluminium. Such excessive transmission of excitation from the ring gear to the housing can now be avoided, as the plastics ring is arranged between the toothings.

In a method for producing the transmission housing, for example, it is envisaged that the transmission housing is cast, i.e., produced by the aforementioned casting process. The housing is then finished, for example. The housing is then fed to an injection moulding machine, for example, by means of which a layer of plastics material is applied to the internal toothing, in particular by injection moulding, wherein the plastic ring is formed from the plastic. In particular it is conceivable that the plastics material is vulcanized onto the internal toothing. The plastics material can be used, for example, to produce a toothing, in particular an internal toothing, which has at least virtually no moulded bevel. For example, the plastics material can at least largely compensate for the bevelled moulding of the internal toothing. As a result, the plastics ring can form a surface contact with the external toothing as mating toothing. This means that even a lower permissible surface pressure can be at least partially compensated for. Depending on the type, plastics materials have damping properties so that vibrations can be damped using the plastics ring, for example. Depending on the layer thickness and type of plastics material, excitations of the ring gear, formed as an internal component, can be decoupled so that excessive noise can be avoided. In other words, noise damping can be achieved with the plastics ring, so that a particularly advantageous noise behavior can be achieved, which is also referred to as NVH behavior (NVH—Noise Vibration Harshness). Particularly in planetary gear sets for electric motors, the torque to be supported by the ring gear and thus the axial length of the respective toothing is high compared to ring gears in multi-speed automatic transmissions for combustion engines, wherein the torque to be supported can be 3,000 Newton-metres, for example.

In an advantageous embodiment of the invention, it is provided that the moulded internal toothing has a moulded bevel in the axial direction and the plastics ring has a continuously changing thickness in the axial direction in a flank area of teeth of the internal toothing to compensate for the moulded bevel of the internal toothing.

In an advantageous embodiment of the invention, it is provided that the planetary gear set is formed as a simple planetary gear set, wherein a rotor of the electric motor is connected to a sun gear of the planetary gear set in a driving manner, and wherein a planetary carrier of the planetary gear set is formed as an output of the planetary gear set.

In an advantageous embodiment of the invention, it is provided that the plastics ring is formed as a plastics material injection-moulded part.

In an advantageous embodiment of the invention, a circumferential groove is provided in an axially central region of the internal toothing.

In particular, it is conceivable that the internal toothing, also known as the housing toothing, can remain mechanically unprocessed at least in its flank area, which can save costs, and a comparatively high roughness of the surface can ensure particularly good adhesion or bonding of the plastics ring to the internal toothing and thus to the housing. The ring gear and thus the external toothing is, for example, a steel part, in particular a milled steel part which has no bevel, in particular no moulded bevel.

A further realization underlying the invention is that with a planetary gear set in which the sun gear, also referred to simply as the sun, is connected to an input and the planetary carrier is connected to the output, a particularly high transmission ratio can be achieved with the same or a small diameter. This is particularly advantageous for reduction ratios for electric motors, especially also for electric axle systems, as any reduction ratio required can be very high due to the high speeds of the electric motor and the radial installation space is always tight, especially in the axle area due to the ground clearance that may be required there. The mentioned circumferential groove offers favourable protection from undesired axial movement of the plastics ring during operation. A second groove can be provided which follows the first groove in an axial direction, for example. A snap ring can be arranged in the second groove and can be used to secure the ring gear axially in the housing.

Further advantages, features and details of the invention can be found in the following description of a preferred exemplary embodiment and with reference to the drawings. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

DETAILED DESCRIPTION OF THE DRAWINGS

In the figures, like or functionally like elements are provided with the same reference signs.

Figure 1:
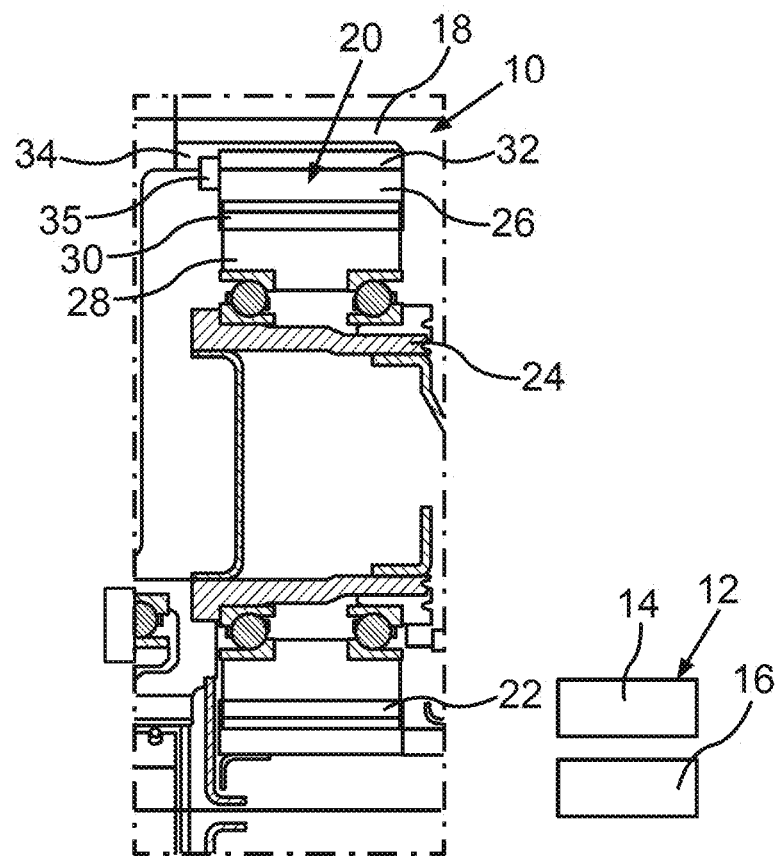
FIG. 1 shows a schematic longitudinal sectional view of a detail of an electric drive device for a motor vehicle.

FIG. 1 shows a schematic longitudinal sectional view of an electric drive device 10 for a motor vehicle, in particular in the form of a motor car, which can be driven by means of the electric drive device 10, in particular purely electrically. The electric drive device 10 has at least one electric motor 12, shown particularly schematically in FIG. 1, which has a stator 14 and a rotor 16. The rotor 16 is a drive via which the electric motor 12 can provide torque to drive the motor vehicle. The electric drive device 10 has a transmission housing 18, which is also referred to simply as the housing. For example, the stator 14 is connected to the transmission housing 18 at least for conjoint rotation. The drive device 10 also has a planetary gear set 20, which is also referred to simply as a planetary set, and has a sun gear 22, a planetary carrier 24 and a ring gear 26. Furthermore, the planetary gear set 20 has planetary gears, of which a planetary gear labelled 28 can be seen in FIG. 1. The respective planetary gear 28 meshes simultaneously with the sun gear 22 and with the ring gear 26. In addition, the respective planetary gear 28 is rotatably mounted on the planetary carrier 24, which is also referred to as the web. The transmission housing 18 is formed from a die-cast material and is therefore produced by casting, in particular by die-casting.

The ring gear 26 is formed separately from the transmission housing 18 and is connected to the transmission housing 18 for conjoint rotation such that the ring gear 26 not only has a first internal toothing 30 with which the respective planetary gear 28 meshes, but the ring gear 26 also has an external toothing 32 which meshes with a corresponding second internal toothing 34 of the transmission housing 18. This ensures that the ring gear 26 is connected to the housing for conjoint rotation. The second internal toothing 34 is also referred to as the first toothing, and the external toothing 32 corresponding to the second internal toothing 34 is also referred to as the second toothing. In order to fix the ring gear 26 axially, i.e., in the axial direction of the planetary gear set 20 on the housing, a securing element is provided, in the present case in the form of a snap ring 35, for example. For example, the snap ring 35 engages in a corresponding groove of the internal toothing 34 and is thus, in turn, axially fixed to the transmission housing 18.

Figure 2:
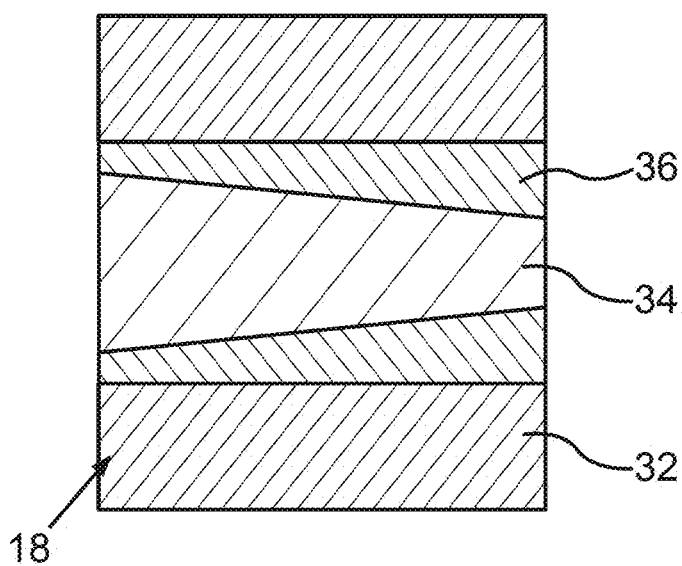
FIG. 2 shows a schematic sectional view of a detail of a cast internal toothing, formed as a drive gearing, of a transmission housing of the electric drive device.

FIG. 2 shows a schematic sectional view of a detail of the internal toothing 34 of the transmission housing 18, also referred to as the drive gearing or designed as a drive gearing. In addition, the sectional view shown in FIG. 2 also shows the external toothing 32, which is formed as an additional drive gearing.

In order to avoid excessive noise and thus achieve a particularly advantageous noise behavior, a ring, also known as a plastics ring 36, formed from a plastics material is arranged between the external toothing 32 and the internal toothing 34, in particular in the circumferential direction of the planetary gear set 20 running around the axial direction of the planetary gear set 20, via which the toothings (external toothing 32 and internal toothing 34), in particular teeth of the toothings, are supported against each other. Since the transmission housing 18 and thus its internal toothing 34 are produced by casting, the respective tooth of the internal toothing 34 is a respective cast tooth. For example, the plastics ring 36 forms, for each cast tooth, a respective plastics tooth, which is arranged on the respective corresponding cast tooth. In particular, the plastics ring 36 is spray-moulded or injection-moulded onto the internal toothing 34, so that the respective plastics tooth is injection-moulded onto the respective cast tooth. It can be seen particularly clearly from FIG. 2 that the plastics material or the plastics ring 36 at least substantially compensates for a respective moulded bevel of the respective cast tooth, so that between the respective tooth of the external toothing 32 and the respective plastics tooth there is not a linear contact, but an at least substantially planar contact, i.e., a surface contact. This can prevent an excessive transmission of excitation from the ring gear 26 to the housing.

Figure 3:
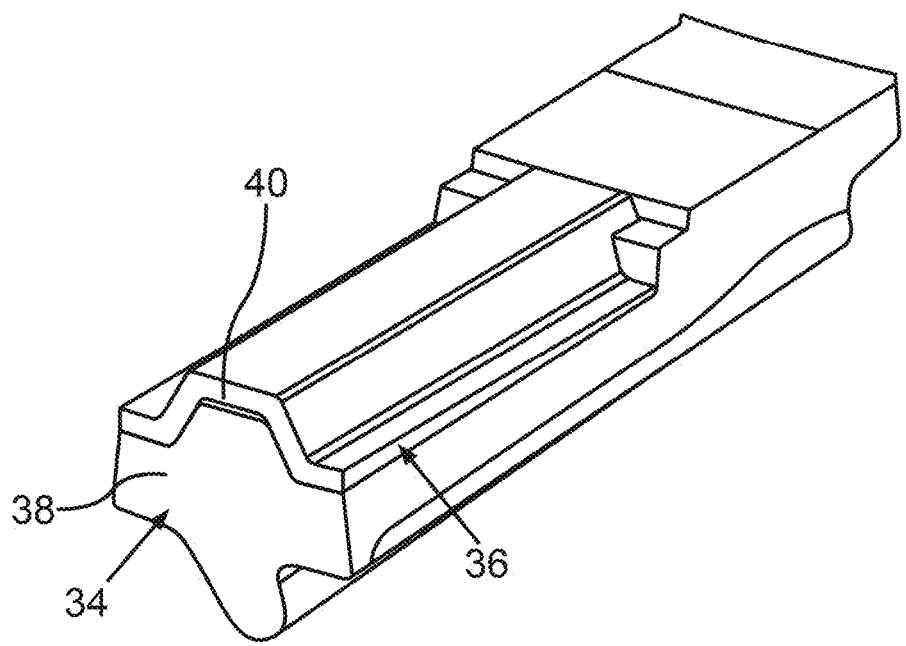
FIG. 3 shows a schematic perspective view of a detail of the internal toothing provided with a plastics material.

FIG. 3 shows a detail of the internal toothing 34, in particular one of the cast teeth labelled 38 in FIG. 3. FIG. 3 also shows a detail of the plastics ring 36, in particular one of the plastics teeth, wherein the one plastics tooth in FIG. 3 is labelled 40.

Figure 4:
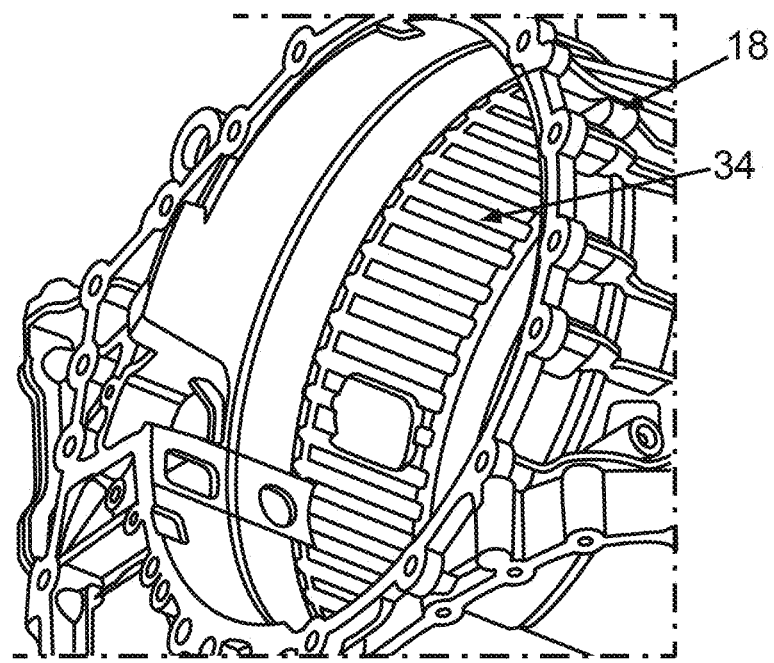
FIG. 4 shows a schematic perspective view of a detail of the transmission housing.

Lastly, FIG. 4 shows a schematic perspective view of a detail of the transmission housing 18, wherein the internal toothing 34 of the transmission housing 18 is particularly clearly recognizable from FIG. 4.

LIST OF REFERENCE CHARACTERS 10 electric drive device
12 electric motor
14 stator
16 rotor
18 transmission housing
20 planetary gear set
22 sun gear
24 planetary carrier
26 ring gear
28 planetary gear
30 first internal toothing
32 external toothing
34 second internal toothing
35 snap ring
36 plastics ring
38 cast tooth
40 plastics tooth

The invention claimed is:

1. An electric drive device (10) for a motor vehicle, comprising:
   an electric motor (12) for driving the motor vehicle;
   a transmission housing formed from a die-cast material; and
   a planetary gear set (20) which has a ring gear (26) and is disposed in the transmission housing (18);
   wherein the transmission housing (18) has a moulded internal toothing (34) as a first toothing with which a corresponding external toothing (32) disposed on the ring gear (26) meshes as a second toothing such that the ring gear (26) is connected to the transmission housing (18) for conjoint rotation;
   wherein a plastics ring (36) is disposed between the internal toothing (34) and the external toothing (32) via which the internal and the external toothings are supported against each other;
   wherein the plastics ring (36) is disposed between the external toothing (32) and the internal toothing (34) in a circumferential direction of the planetary gear set (20) running around an axial direction of the planetary gear set (20);
   wherein the plastics ring (36) forms a respective plastics tooth for each tooth of the internal toothing (34) which is formed as a respective cast tooth and wherein the respective plastics tooth is disposed on a corresponding respective cast tooth;
   wherein the internal toothing (34) has a moulded bevel in the axial direction;
   wherein the plastics ring (36) has a continuously changing thickness in the axial direction in a flank region of teeth of the internal toothing (34) which compensates for the moulded bevel of the internal toothing (34).

2. The electric drive device (10) according to claim 1, wherein the planetary gear set (20) is formed as a simple planetary gear set, wherein a rotor (16) of the electric motor (12) is connected to a sun gear (22) of the planetary gear set (20) in a driving manner, and wherein a planetary carrier (24) of the planetary gear set (20) is formed as an output of the planetary gear set (20).

3. The electric drive device (10) according to claim 1, wherein the plastics ring (36) is formed as a plastics injection-moulded part.

4. The electric drive device (10) according to claim 1, wherein there is a circumferential groove in an axially central region of the internal toothing (34).

* * * * *